US009009723B2

(12) United States Patent
Degenaro et al.

(10) Patent No.: US 9,009,723 B2
(45) Date of Patent: *Apr. 14, 2015

(54) DISTRIBUTED ACCELERATION DEVICES MANAGEMENT FOR STREAMS PROCESSING

(71) Applicant: International Business Machines Corporation, Armonk, NY (US)

(72) Inventors: Louis Ralph Degenaro, White Plains, NY (US); James Ryan Giles, Yorktown Heights, NY (US); Gabriela Jacques Da Silva, Champaign, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/847,478

(22) Filed: Mar. 19, 2013

(65) Prior Publication Data

US 2015/0058614 A1    Feb. 26, 2015

Related U.S. Application Data

(63) Continuation of application No. 12/201,456, filed on Aug. 29, 2008, now Pat. No. 8,434,087.

(51) Int. Cl.
*G06F 9/46* (2006.01)
*G06F 15/00* (2006.01)
(Continued)

(52) U.S. Cl.
CPC ............... *H04L 49/70* (2013.01); *G06Q 10/06* (2013.01)

(58) Field of Classification Search
CPC . G06F 12/109; G06F 12/1009; G06F 9/5027; G06F 3/0346; G06F 3/03; H04L 12/24; H04L 12/4641; H04L 45/02; H04L 63/0272

USPC .......................................... 709/228; 718/104
See application file for complete search history.

(56) References Cited

U.S. PATENT DOCUMENTS 5,828,858 A    10/1998 Athanas et al.
6,080,207 A    6/2000 Kroening et al.
(Continued)

OTHER PUBLICATIONS

Acosta et al., "Reconfigurable Processor for a Data-Flow Video Processing System", SPIE FPGA's for Fast Board Development and Reconfigurable Computing, 2607 (1995).
(Continued)

*Primary Examiner* — Arvin Eskandarnia
*Assistant Examiner* — Margishi Desai
(74) *Attorney, Agent, or Firm* — August Law, LLC; George Willinghan (57) ABSTRACT

A method for managing distributed computer data stream acceleration devices is provided that utilizes distributed acceleration devices on nodes within the computing system to process inquiries by programs executing on the computing system. The available nodes and available acceleration devices in the computing system are identified. In addition, a plurality of virtual acceleration device definitions is created. Each virtual acceleration device definition includes attributes used to configure at least one of the plurality of identified acceleration devices. When an inquiry containing an identification of computing system resources to be used in processing the inquiry is received, at least one virtual acceleration device definition that is capable of configuring an acceleration device in accordance with the computing system resources identified by the inquiry is identified. That acceleration device is configured in accordance with the identified virtual acceleration device definition and is used to process the inquiry.

12 Claims, 3 Drawing Sheets

(51) Int. Cl.
*G06F 7/38* (2006.01)
*H04L 12/931* (2013.01)
*G06Q 10/06* (2012.01)

(56) References Cited

U.S. PATENT DOCUMENTS

| | | |
|---|---|---|
| 6,557,017 B1 | 4/2003 | Venable |
| 6,775,829 B1 | 8/2004 | Kroening et al. |
| 7,155,975 B2 * | 1/2007 | Mitani et al. ............... 73/504.03 |
| 7,370,239 B2 | 5/2008 | Apel et al. |
| 7,480,789 B1 | 1/2009 | Donlin et al. |
| 7,613,904 B2 | 11/2009 | Jones et al. |
| 7,660,969 B2 | 2/2010 | Jensen et al. |
| 7,715,983 B2 * | 5/2010 | Barrus et al. ...................... 702/2 |
| 2002/0108033 A1 | 8/2002 | Kroening |
| 2005/0097305 A1 | 5/2005 | Doering et al. |
| 2005/0278680 A1 | 12/2005 | Mukherjee et al. |
| 2007/0067366 A1 * | 3/2007 | Landis .......................... 707/205 |
| 2007/0083666 A1 | 4/2007 | Apelbaum |
| 2007/0083868 A1 * | 4/2007 | Sankaranarayan et al. ... 718/104 |
| 2007/0115388 A1 | 5/2007 | Apelbaum |
| 2007/0138600 A1 | 6/2007 | Hartlep |
| 2007/0168600 A1 | 7/2007 | Anthony et al. |
| 2007/0233529 A1 | 10/2007 | Isnardon et al. |
| 2007/0288652 A1 | 12/2007 | Carter et al. |
| 2008/0028118 A1 | 1/2008 | Sayers et al. |
| 2008/0112357 A1 | 5/2008 | Gossain et al. |
| 2008/0228971 A1 | 9/2008 | Rothman et al. |
| 2008/0320151 A1 * | 12/2008 | McCanne et al. ............. 709/228 |
| 2009/0024770 A1 | 1/2009 | Dubs et al. |
| 2009/0106801 A1 | 4/2009 | Horii |
| 2009/0282194 A1 | 11/2009 | Nagashima |
| 2009/0327683 A1 | 12/2009 | Cabot et al. |
| 2010/0023674 A1 | 1/2010 | Aviles |
| 2010/0036963 A1 | 2/2010 | Gahm et al. |
| 2010/0050214 A1 | 2/2010 | Funabiki et al. |
| 2010/0082618 A1 | 4/2010 | Ott, Iv et al. |
| 2010/0107172 A1 | 4/2010 | Calinescu et al. |
| 2010/0179879 A1 | 7/2010 | Cunningham et al. |

OTHER PUBLICATIONS

Amini et al., "Design, Implementation and Evaluation of the Linear Road Benchmark on the Stream Processing Core", SIGMOD(2006).
C. Clark and D. Schimmel, "A Pattern-Matching Co-Processor for Network Intrusion Detection Sytems", Proceedings of IEEE International Conference on Field-Programmable Technology (FPT), Dec. 2003.
E. Horta et al., "Dynamic Hardware Plugins in an FPGA with Partial Run-Time Reconfiguration", DAC (2002).
J. Jean et al., "Dynamic Reconfiguration to Support Concurrent Applications", IEEE Transactions of Computers.
M. Littlefield and J. Wetch, "FPGA's for Stream Processing: A Natural Choice", COTS Journal, 2008.
N. Weaver et al., "The Shunt: An FPGA-Based Accelerator for Network Intrusion Prevention", FPGA '07, Feb. 2007.
R. Franklin, et al., "Assisting Network Intrusion Detection with Reconfigurable Hardware", IEEE Symposium on Filed-Programmable Custom Computing Machines, Apr. 2002.

* cited by examiner

DISTRIBUTED ACCELERATION DEVICES MANAGEMENT FOR STREAMS PROCESSING

CROSS-REFERENCE TO RELATED APPLICATIONS

The present application is a continuation of co-pending U.S. patent application Ser. No. 12/201,456 filed Aug. 29, 2008. The entire disclosure of that application is incorporated herein by reference.

STATEMENT REGARDING FEDERALLY SPONSORED RESEARCH

The invention disclosed herein was made with U.S. Government support under Contract No. H98230-07-C-0383 awarded by the U.S. Department of Defense. The Government has certain rights in this invention.

FIELD OF THE INVENTION

The present invention relates to enhanced processing performance in a distributed computing environment though managed use of distributed reconfigurable acceleration devices as stream processing accelerators.

BACKGROUND OF THE INVENTION

The concept of reconfigurable computing was first proposed in 1960 by Gerald Estrin. In the paper "Organization of Computer Systems—The Fixed Plus Variable Structure Computer" he conceptualized a computer composed of two cooperative components: a standard processor and an array of reconfigurable hardware. The standard processor would control the behavior of the reconfigurable hardware. The reconfigurable hardware would be customized to perform a specific task, such as image processing or pattern matching, and would perform its assigned task as quickly as a dedicated piece of hardware. When finished, the customizable hardware could be reconfigured to perform another task. Estrin thus described a hybrid computer structure combining the flexibility of software with the speed of hardware.

Toward Estrin's idea, application specific integrated circuits (ASICs) are one form of configurable hardware. Normally these devices don't offer much in the way of reconfigurability once manufactured. However, field programmable gate arrays (FPGAs) can be re-programmed by the customer after manufacturing. FPGA devices offer greater flexibility through reprogrammability, but are generally much slower than ASIC devices designed for a specific purpose. FPGAs fit nicely as the "Variable" part of Estrin's vision. Interest in FPGAs has increased dramatically with the advent of modern devices that can be reconfigured during runtime. As such, FPGAs coupled with general purpose CPUs offer the possibility of more cost effective processing than general purpose CPUs alone. A large body of work has recently been published to solve specific problems by offloading processing from a general purpose CPU to a more efficient FPGA device reprogrammed for a specific purpose.

The paper "A Pattern-Matching Co-Processor for Network Intrusion Detection Systems", Clark et al., focuses specifically on network intrusion detection systems, and in particular on efficient pattern matching in network packets using a FPGA as a co-processor. The idea is to match a large number of known patterns against a small number of data sets (packets). Software-based matching techniques are far too slow; thus a FPGA is programmed to do the matching by translating Snort Rules into FPGA circuits. However, this is just one specific example of how to employ an FPGA as an auxiliary processing device and not a general reconfigurable device management facility.

The paper "Assisting Network Intrusion Detection with Reconfigurable Hardware", Franklin, et al., shows that compiling Snort Rules into FPGA bit streams yields a vast performance advantage over software techniques with respect to pattern matching and intrusion detection. Similar to the paper cited above, this is another example of how FPGAs can be advantageously employed to accelerate performance. Again, however, no reconfigurable device management facility is described.

The paper "The Shunt: An FPGA Based Accelerator for Network Intrusion Prevention", Weaver et al., is another paper like the previous two cited above that focuses on acceleration specifically with respect to network intrusion detection in particular. Likewise, it too does not describe middleware for the management of a dynamically evolving cluster of computers, each computer potentially having one or more heterogeneous acceleration devices attached, all of which are to be shared over time among a set of users according to user and/or administrator policies.

The paper "Dynamic Reconfiguration to Support Concurrent Applications", Jean et al., discusses a resource manager that manages allocation and de-allocation of a single FPGA among a collection of individual applications. Savings are realized by avoiding reloading the FPGA when more than one application has use for the currently installed FPGA image. However, it has shortfalls including no method for managing multiple, distributed FPGAs. It has no discovery capabilities and no dynamic FPGA add and remove capabilities. Further, its brute force scheduling method prohibits any ability to provide FPGA services according to user or administrator defined policy.

The paper "Reconfigurable Processor for Data-Flow Video Processing System", Acosta et al., classifies uses of FPGAs in two broad categories: to offload bit parallel computations, and for computationally intensive program inner loops. It discusses a system named Cheops and cites prior art having other systems named Anyboard, SPLASH, PRISM-II and others that all pre-date the modern stream processing era. Cheops, in particular, is a one of a kind system designed for the specific purpose of processing and displaying digital video sequences. Neither it nor the prior art cited provide a general purpose stream processing acceleration method or system. None contemplate distributed acceleration device management.

The article "FPGAs for Stream Processing: A Natural Choice", Littlefield et al., links the use of FPGAs to stream processing. Described is a typical configuration, where a multi-computer system's input devices are connected to FPGA computing engines via dedicated links, and the various processing elements are interconnected via a switching communications fabric. Also claimed is the suitability of FPGAs for early stage stream processing. No detailed information is disclosed about management facilities provided by the communication middleware package. No disclosures are made with respect to distributed architectures, dynamic discovery or policy-driven application allocation/de-allocation of reconfigurable resources.

In U.S. Pat. No. 5,828,858, the architecture disclosed allows multiple entities (applications) to control, allocate, and utilize resources (FPGAs) from a common pool simultaneously without multitasking or time slicing. Employed is a distributed control and decentralized scheduling approach.

In U.S. Published Patent Application no. 2008/0028186A1, employment of an FPGA directly on a motherboard as an acceleration device is disclosed. This system also fails to address distribution, sharing, policies and other management issues.

In U.S. Published Patent Application no. 2005/0278680A1, "[s]cheduling refers generically to a process of time sequencing a plurality of tasks or subtasks, [and] partitioning refers generically to a process of developing a physical hardware design for implementing the task or subtask in actual hardware. As used herein, hybrid network typically refers to a collection of elements including one or more processors preferably making up the nodes of a cluster or grid that are upgraded with FPGA boards for hardware acceleration . . . " Also disclosed is a software tool that "implements application designs onto the hybrid network, controls data flow, and schedules executions on the network using application program interfaces to generate fast and accurate results."

In U.S. Published Patent Application no. 2005/0097305A1, an on-demand non-distributed FPGA co-processor loader is disclosed. It has no facilities for dynamic accelerator detection nor does it do any scheduling. It is a load and go system—when the microprocessor needs acceleration the FPGA is loaded accordingly and dispatched.

SUMMARY OF THE INVENTION

Systems and methods in accordance with the present invention are directed to a method for managing distributed computer data stream acceleration devices in which available nodes and available acceleration devices in a computing system are identified. The computing system includes a plurality of nodes and a plurality of acceleration devices disposed on one or more of the nodes. These acceleration devices include a field programmable gate array, an application specific integrated circuit, a complex programmable logic device and combinations thereof. In one embodiment, the acceleration devices are dynamically detected, and computing system stream data are dynamically routed to and from each identified acceleration device. In one embodiment, dynamically routing corresponding data includes configuring the acceleration device to receive packets across a network originating from one or more nodes within the computing system and configuring the acceleration device to produce packets across the network destined to one or more of the nodes.

A plurality of virtual acceleration device definitions are also identified. Each virtual acceleration device definition includes attributes that are used to configure at least one of the plurality of identified acceleration devices. An inquiry containing an identification of computing system resources to be used in processing the inquiry is also identified. In one embodiment, the identified computing system resources include data stream acceleration devices required to process the inquiry and preferred data stream acceleration devices to be used in processing the inquiry. At least one virtual acceleration device definition capable of configuring an acceleration device in accordance with the computing system resources identified by the inquiry is identified, and at least one of the plurality of identified acceleration devices is configured in accordance with each identified virtual acceleration device definition. Each configured acceleration device is used to process the inquiry.

In one embodiment, the method also includes scheduling and dispatching at least one inquiry process element to process the inquiry. Each inquiry process element utilizes at least one of the acceleration devices, and the step of using each configured acceleration device includes using each configured acceleration device by one of the process elements. In one embodiment, configuring the at least one discovered acceleration device includes identifying a program corresponding to the scheduled process element during runtime and loading the identified program into the acceleration device coincidental with dispatching the corresponding process element. In one embodiment, at least one policy is identified to govern the use of acceleration devices within the computing system. Therefore, utilizing acceleration devices and configuring the acceleration devices can be performed in accordance with the identified policy. At least one of a computing system user, administrator and system analytics to identify the policy can be used to identify the policy.

In one embodiment, scheduling and dispatching of processing elements includes identifying a first set of process elements, dispatching the first set of process elements to nodes utilizing acceleration devices and identifying a second set of process elements separate from the first set, wherein the process elements in the second set are not dispatched to nodes due to a lack of available acceleration devices. In one embodiment, a revised first set of process elements is identified containing process elements utilizing one or more virtual acceleration device definitions that differ from the virtual acceleration device definitions utilized with the previous first set of process elements. In addition, a revised second set of process elements is identified, and one or more acceleration devices are reconfigured in accordance with the different virtual acceleration device definitions associated with the revised first set of process elements. In one embodiment, administrator policy specifications and user rules are used to rank processing elements, and each process element that utilizes the acceleration devices is placed into either the first set of process elements or the second set of process elements in accordance with the rank.

DETAILED DESCRIPTION

Exemplary embodiments of systems and methods in accordance with the present invention provide for the management of stream acceleration devices in a distributed network of general purpose computers. Management includes discovery, virtualization, policy application and scheduling of the stream acceleration devices. Discovery is the ability of the present invention to dynamically add and remove acceleration devices during runtime, without the need for system reconfiguration or middleware redeployment, i.e., no system shutdown and restart with new configuration data is required. Virtualization is the ability of the system to allow applications to describe acceleration preferences and requirements abstractly, and for the system to match these user specifications with available acceleration resources, all during runtime. Policy is the system provision for user and administrator runtime control for accessibility to distributed stream acceleration devices. A system scheduling facility dynamically enforces policy according to the supply of discovered acceleration devices and the demand by user applications for them. Applications may advantageously employ system managed acceleration devices to realize improved performance, enhanced functionality, lower costs and a combination thereof. Suitable managed acceleration devices include FPGAs, Complex Programmable Logic Devices (CPLDs) and ASICs, all known in the art, and other similar hybrid devices which may incorporated features of each. This silicon-based family of hardware devices employed specifically for processing streams of data (e.g., text, audio, video) is referred to generally as data stream acceleration devices. A data stream acceleration device is attached to a general purpose computer directly, e.g., plugged in to an adapter on that computer's motherboard, or is connected via a network interface in order to interrogate and configure it. Additionally, acceleration devices are connected to both a source and a destination, usually a network, in order to both receive and transmit data streams.

In accordance with the present invention, data stream acceleration processing external to a general purpose central processing unit (CPU) provides the advantage of high speed processing of repetitive tasks at a low cost. Many tasks would not be feasible if processing on a general purpose CPU alone, without the assistance of data stream acceleration devices. That is, a general purpose CPU alone would not be able to process data stream packets fast enough. A very large collection general purpose CPUs without acceleration devices may be fast enough but would be far too expensive. Exemplary embodiments of systems and methods in accordance with the present invention advantageously provide management control and flexibility over a collection of such acceleration devices when attached to a cluster of general purpose computers tasked with processing streams of data.

Figure 1:
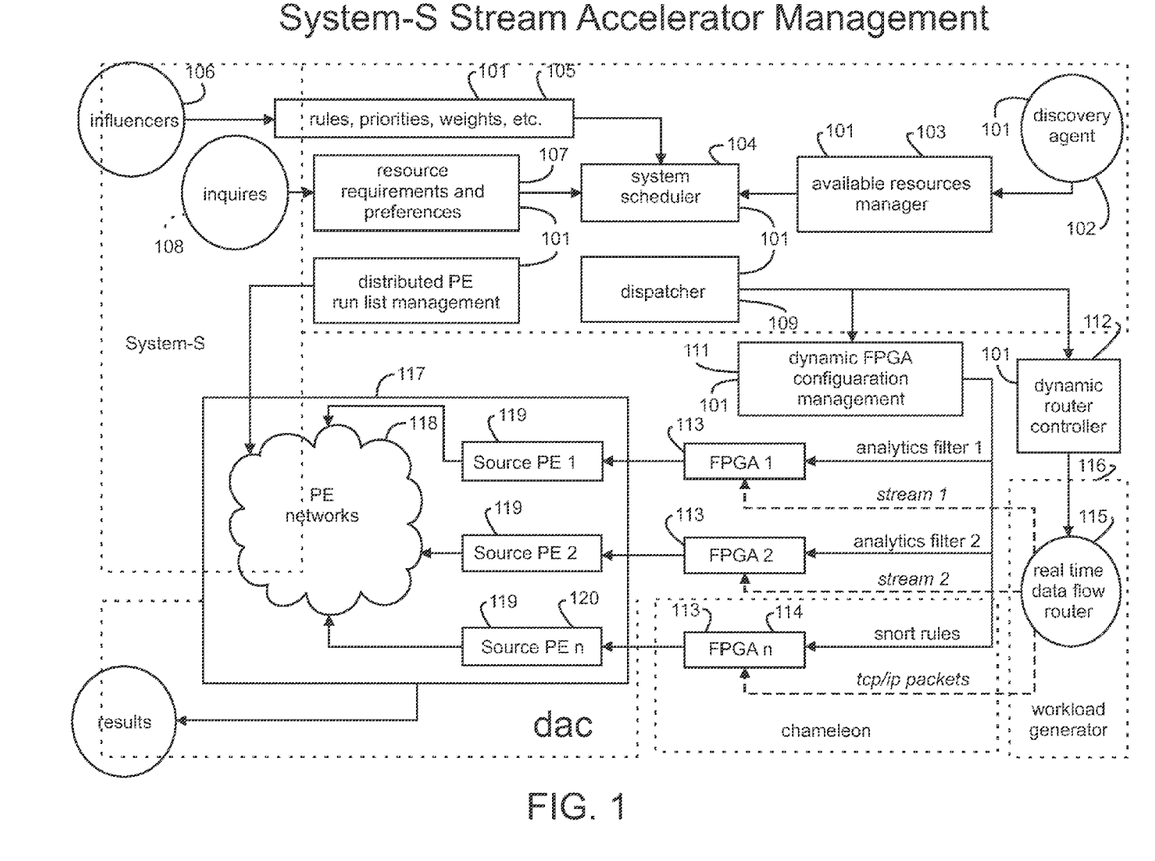
FIG. 1 is a schematic diagram illustrating the overall runtime facilities for System-S Stream Accelerator Management.

Referring to FIG. 1, an exemplary embodiment of the facilities provided by the present invention during runtime for stream processing acceleration is illustrated. The system includes a plurality of runtime singleton services 101, e.g., scheduler, dispatcher, etc. These singleton services can be co-located on a single processing node or distributed among a collection of processing nodes in communication across one or more local or wide area networks. Certain distributed runtime services are located on multiple nodes throughout the network. For example, the runtime distributed service discovery 102 is located one per managed execution node. In addition to distributed services, each managed execution node can host one or more acceleration devices. These acceleration devices can be dynamically added or deleted (if physically possible) to an execution node and immediately utilized by means of the dynamic detection capabilities of the middleware of the present invention. In addition, execution nodes may be dynamically added or removed from the cluster of nodes managed by the system. Through discovery, the system is able to utilize dynamically added execution nodes and acceleration devices immediately during runtime. Likewise, the system is able to adapt to the loss of execution nodes and acceleration devices dynamically during runtime. Nodes are interconnected across one or more suitable networks including local area networks and wide area networks.

The present invention as described herein and illustrated in the accompanying figures is directed to a System-S stream acceleration facilities. However, the present invention is not limited to the illustrated system and can be used with any computing system containing distributed nodes and distributed acceleration devices. As illustrated, the System-S, i.e., the system, includes a plurality of execution nodes in communication across one or more networks and plurality of discovery agents 102. Each discovery agent is deployed on one of the execution nodes. The execution nodes are in communication through one or more local or wide area networks. The system also includes at least one available resource manager 103 running on one of the nodes of the network. Each execution node is connected to and in communication with a network and communicates with the system available resources manager 103 across the network. Any suitable network communication protocols can be used for communications across the system network. In one embodiment, Transmission Control Protocol over Internet Protocol (TCP/IP) provides a network layer over which Hypertext Transport Protocol (HTTP) messages are exchanged between the discovery agents 102 and the available resources manager 103.

When an execution node first boots, the corresponding discovery agent 102 on that node analyzes the attached acceleration hardware, including the current status of each, and issues a status report over the network that is received by the available resources manager 103. The system also includes a scheduler 104 running on a node of the system. This node can be the same node or a different node from the node containing the available resource manager. The available resource manager 103 is in communication with the scheduler and communicates the status report to the system scheduler. These status reports contain tuples of information employed by the scheduler 104 for matching accelerators with loadable images. Any new acceleration devices that have been reported with suitable status are added to a collection of known-accelerator information tuples kept by the available resources manager 103.

Each discovery agent periodically issues updated status reports. When a discovery agent reports an unsuitable status for an acceleration device, the available resources manager removes that acceleration device from the known-accelerator information tuples collection. If a discovery agent fails to issue one or more expected periodic reports, the available resource manager may, according to policy, remove any acceleration devices associated with that discovery agent from the known-accelerators collection. The available resource manger keeps the system scheduler 104 apprised of individual and system-wide accelerator status. The system scheduler 104 uses the accelerator status, including accelerator status changes, provided by the resource manager for management and allocation of the accelerators to various system demands. This management includes initial allocation and subsequent re-allocation of known acceleration devices to user applications requesting streaming acceleration services.

The available resources manager 103 collects and maintains information tuples provided by each of the discovery agents 102. For each acceleration device, the corresponding discovery agent sends one or more information tuples to the available resources manager 103. The tuples contain information, for example, manufacturer, gates, configuration address and current status among other information, that may be desired by the scheduler for consideration during the decision making process of acceleration device management, i.e., allocation.

The system also includes a rules, priorities, weights, etc. manager 105, herein rules manager, disposed on one of the nodes in the system and in communication with the system scheduler 104. The rules manager 105 performs several roles. In one role, the rules manager 105 provides an acceleration device virtualization facility. A plurality of influencers 106 is in communication with the rules, priorities and weights manager 105. Suitable influencers are users, administrators and system analytics in the form of artificial intelligence programs. The influencers create virtual acceleration device definitions with acceleration device attributes including, for example, function, input types, output types, loadable image information, e.g., name and location, manufacturer, model, processor, bus, size, speed, classification, security level, and other vital characteristics. These virtual acceleration device definitions are stored in one or more storage or database locations including a persistent memory storage location.

In a role as gatekeeper, the rules manager 105 permits administrators and system analytics to create system-wide policies and rules, such as setting the security level of a virtual accelerator, while users and user analytics are restricted to creating policies and rules relative to the desirability of using one or more virtual acceleration devices. For example, an administrator may define a virtual accelerator as having security level blue. A user would not be able to change that security level. Further, an administrator may define system policies for reusability of accelerator devices. For example, the administrator can define a policy that if an acceleration device is employed by the system scheduler to process a security level red virtual acceleration task then that same acceleration device, when finished, may not be able to be reassigned to process a security level green virtual acceleration task until a suitable scrubbing process is successfully completed.

The system receives a plurality of inquiries 108, from, for example, applications running on the system. These inquiries 108 result in resource requirements and preferences 107 that are communicated to the scheduler 104. The scheduler 104 uses the virtual acceleration device definitions provided by the influencers 106 in combination with the known-accelerator collection provided by the available resource manager 103 to satisfy resource requirements and preferences 107 resulting from inquiries 108. In one embodiment, resource requirements and preferences 107 are user application specifications for runtime use of one of more of the virtual acceleration devices within the system. In one embodiment, one or more virtual acceleration devices may be required by an application, i.e., that application cannot run unless an implementation of the specified virtual acceleration device is advantageously allocated. These are resource requirements. Alternatively, one or more virtual acceleration devices may be preferred by an application, i.e., the application can run without the specified virtual accelerators but prefers to have those accelerators allocated for improved performance, functionality or other reasons. These are resource preferences. As used herein, application, user application and inquiry are interchangeable.

Exemplary embodiments of systems and methods in accordance with the present invention utilize a virtualization that includes the three independent sets of information tuples. These three independent sets include the tuples produced by the discovery agents 102, the tuples authored by influencers 106 and the tuples submitted by inquiries 108. All three independent information tuples are reconciled by the system scheduler 104 during runtime to allocate the acceleration devices within the system to the inquiries desiring those acceleration devices.

In one exemplary embodiment, the system has been deployed and is up and running A user or administrator in the role of influencer 106 employs a system provided facility, e.g., command line interface, to define a virtual stream acceleration device containing {function=intruder.packet.sniffer, image=url/sniffer.img, manufacturer=QL, size=532 gates}. In one embodiment, this information is stored in persistent memory by the rules manager 105. Specified by the virtual stream acceleration device definition is the function that is performed by the image and the hardware requirements of the image; however, the definition does not contain any specific actual device upon which to deploy the image. A plurality of virtual stream acceleration devices can be defined by one or more influencers 106. For purposes of the present embodiment, a single virtual stream acceleration device has been defined. Images are used to cause the required or preferred behavior of the applications in the acceleration devices. In particular, each image is the compiled program and its external configuration data, if any, that is loaded into an acceleration device to realize the corresponding function.

Independent of the influencers and inquiries, one or more already running execution node discovery agents 102 dynamically detect actual acceleration devices 113 within the system. One of the actual acceleration devices 114 has an associated characteristic tuple {manufacturer=QL, size=532 gates, config.address:port=9.2.168.1:100, data-in address:port=9.2.168.2:200, data-out address:port=9.2.168.3:300}. All discovered actual acceleration devices are reported to the available resources manager 103 causing new entries in the known-accelerators collection. The acceleration device with config.address:port 9.2.168.1:100 is compatible with function intruder.packet.sniffer since there is a match for both manufacturer and size. If not specified, a default port is assumed by the system, such as 100.

Thus, the system now has a virtual acceleration device defined and known to the rules manager 105 to perform the intruder.packet.sniffer function and an actual acceleration device known to the available resources manager 103 that could, if so configured, execute the corresponding image. That is, the system has made a usability link between the virtual stream acceleration specification for function intruder.packet.sniffer and an actual acceleration device with configuration address and port 9.2.168.1:100. The system has come to understand that any inquiry needing the virtual stream acceleration function intruder.packet.sniffer could be satisfied by dynamically configuring configuration address and port 9.2.168.1:100 with the url/sniffer.img.

Continuing the example runtime scenario, next an inquiry 108 is submitted to the system though an application programming interface (API). The inquiry, as part of its specification, lists the function intruder.packet.sniffer as a requirement for processing. The resource requirements and preferences manager 107 determines that the actual stream acceleration device with config.address:port=9.2.168.1:100 when loaded with image url/sniffer.img will perform the inquiry requested function. If there were other linked pairs of virtual stream accelerator to actual stream acceleration device available, the entire list containing a plurality of linked pairs of them would be associated with this inquiry for consideration by the system scheduler. The potential accelerator pairs list and the inquiry are then forwarded to the system scheduler 104. The system scheduler selects the best match for the inquiry with available stream accelerators subject to policies, as defined to and provided by the rules, priorities, weights, etc. manager 105. These policies may dictate, for example, that the present inquiry is of lesser rank than already dispatched inquiries that are currently using all available stream accelerators. Therefore, the present inquiry must either run without acceleration, wait for an available accelerator, or be canceled according to administrator and user specifiable policies.

If there is one or more available accelerator pairs eligible for association with the inquiry to be dispatched, the scheduler chooses one and sends the choice of accelerator and the inquiry to a dispatcher 109 running on a node within the system for coordination and deployment. The dispatcher 109 sends to its deployment agent 111 the information needed, e.g., config.address:port and image url, to load the acceleration device with the proper image. As illustrated, the deployment agent is a dynamic FPGA configuration management. In one embodiment, the deployment agent is a separate agent running on one of the nodes of the system. Alternatively, the deployment agent 111 is one of the discovery agents performing a dual role. The deployment agent 111 reads the image url and writes the image to the configuration address and port of the appropriate acceleration device. At that point, the acceleration device is ready to process streaming data. Additional steps are undertaken before processing with the acceleration device commences.

In one embodiment, the data-in and data-out address and ports of the acceleration device are configured, if network connected. In some instances, the acceleration device input source or output destination or both are hardwired. Therefore, there is no configuration to perform. In the hardwired embodiment, the expected input source and output destination of the accelerator must meet the submitted application program requirements absent acceleration device data stream routing configurability. For the configurable embodiments, the dispatcher communicates address and port information to the deployment agent 111 and to a dynamic router controller 112 as appropriate. When the output destination address is configurable, each acceleration device is programmed by the deployment agent 111 such that outbound packets from the acceleration device are labeled with the specified output address and port. More than one destination is possible for each outbound packet. Similarly, when the input source address is configurable, the dynamic router controller 112 is configured to signal the real time data flow router 115 to send packets to the specified input data-in addresses and ports.

In one embodiment, the real time data flow router 115 includes a network packet IP router that can be configured in promiscuous mode to send packets both to their original destination, e.g., absent acceleration, and to the one or more configured additional destinations as specified by the dynamic router controller 115. In another embodiment, the packets are strictly redirected to the dynamic router controller 115 configured destinations only. With the completion of this step, streams of information are now flowing from raw streams shown as the workload generator component 116 comprising the real time data flow router 115 and its information supply (not shown), to the configured stream accelerator devices 113.

Next the inquiry 117 that consumes the configured accelerator 114 is launched. The dispatcher 109 employs a distributed processing element manager 110 to manage the lifecycles of each one of a plurality of individual processing elements that constitute the stream processing inquiry. Lifecycle management is accomplished by employing multiple finite state machines, one each for each processing element and one for the overall collection of processing elements. Prior to runtime, consumer processing elements desiring stream acceleration services are annotated and/or are configured with meta-data indicating the need for information produced by a source processing element of a desired type. During runtime, the network of consumer processing elements 118 have their needs satisfied by the system through dynamic connections to system generated source processing elements 119, which are producing information of the desired types.

Processing elements are application program fragments that are deployed across a cluster of computers. Certain processing elements may consume data produced by the data stream acceleration devices. The process elements themselves are programs too complex to be executed on data stream acceleration devices. For example, the amount of memory required to perform the calculations of a given processing element may far exceed the capabilities of a data stream acceleration device.

Data stream acceleration devices employed by applications in the system can be used to filter a vast volume of data stream packets and produce a reduced volume of import ones for consumption by the associated processing elements. For example, a data stream acceleration device input may be real time stock market information as tuples comprising symbol, price and quantity, such as {IBM, 125.00, 100}. The data stream acceleration device may be configured to produce tuples once per minute comprising the 5, 10 and 30 minute average price, such as {IBM, 124.34, 125.99, 126.51}. Processing elements can then easily process the reduced set of data to perform more complex analysis. For example, a processing element may receive reduced average price quotes for IBM and other stock ticker symbols and, together with other information, make stock buy or sell recommendations.

By virtue of the configured input addresses and ports of the system-provided source processing elements 119, the data produced by the stream accelerators 113 are delivered to them correspondingly. For example, in support of one or more inquiries, at the direction of the dispatcher 109 the deployment agent 111 loaded snort rules into the target stream accelerator device 114. In addition, the dynamic router controller 115 configured the input network to send TCP/IP packets to the target stream accelerator device 114. In addition, the system launched a source processing element 120 that receives the accelerator 114 produced output.

The order of the steps for employing acceleration is not fixed. For example, the inquiry may be already running without any or with a reduced set of accelerators. Later, when one or more additional accelerators are added to the system, an already running inquiry may be given the opportunity to employ same. Steps may also occur in parallel, for example the bring-up of the inquiry processing elements network may occur simultaneous with the configuration of the accelerators. Further, even after a steady state has been reached whereby all accelerators have been assigned, re-allocations of accelerators to inquiries may occur in accordance with defined policies 105, which may themselves change dynamically over time.

An example deployment is now presented. To show the integration of System-S and hardware accelerators, an existing streaming application, named DAC, has been enhanced with a hardware accelerator to pre-process a source stream of network packets.

A Disaster Assistance Claim monitoring application (DAC) is a reference application of System-S. It aims at discovering fraudulent claims attempted against disaster assistance programs. DAC consumes three types of different streams: (i) a processed claim application, with information about the claim itself, e.g., name, address; (ii) a VOIP stream, containing data about conversations between claim applicants and claim processing center agents; and (iii) e-mail logs, with data about messages exchanged between agents and the outside world. Since DAC is a reference application, the streams are not real data, but instead are produced by a workload generator. The workload is generated with data correlation in mind, so the application can produce some meaningful output. In the real world, it is expected that the streams do have correlated data.

Figure 2:
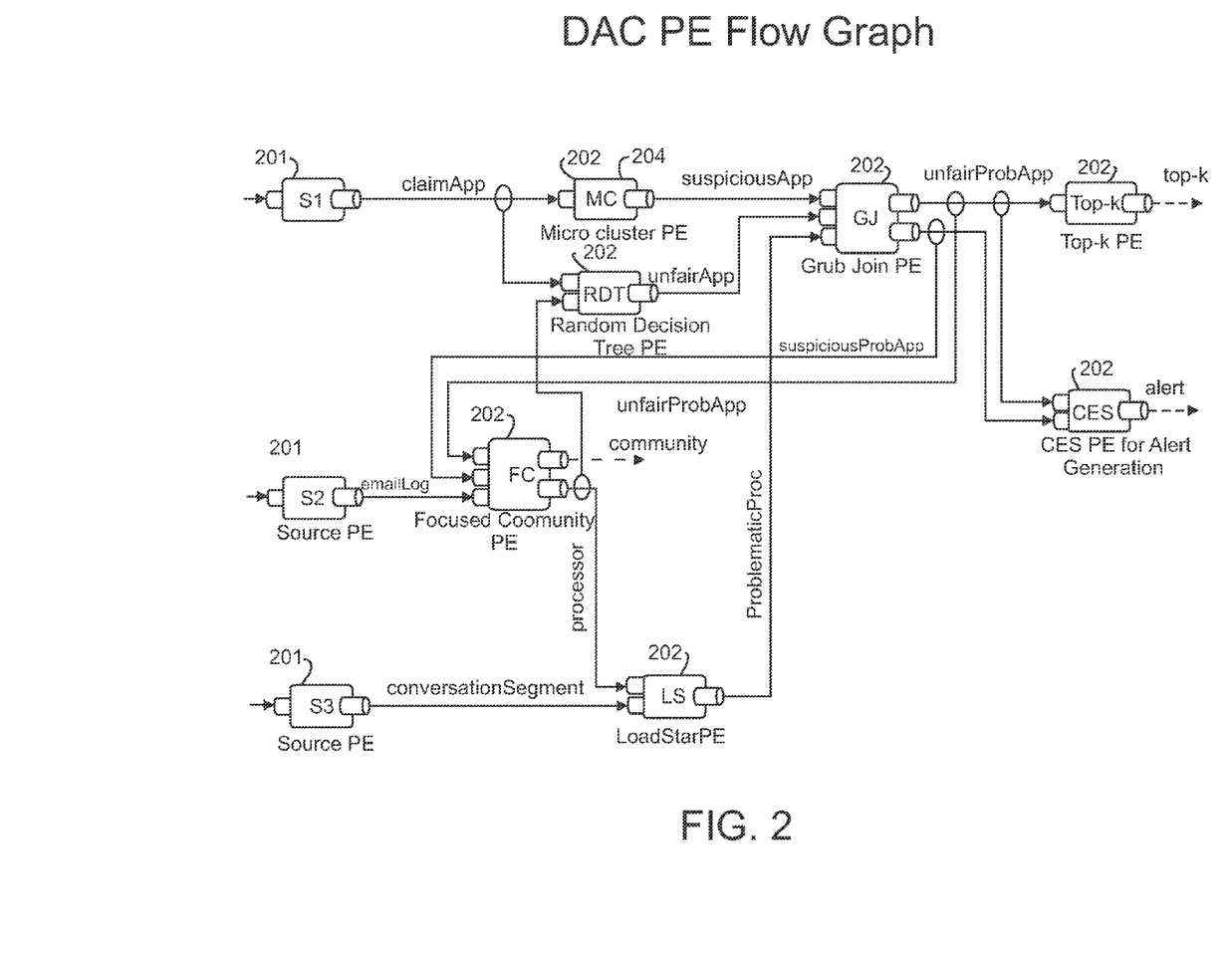
FIG. 2 is an embodiment of a Processing Element Flow graph from the Disaster Assistance Claim reference application.

Referring to FIG. 2, a DAC Processing Element (PE) flow graph is illustrated. No acceleration is present. The figure describes how the source streams are processed and correlated to generate the application output. The graph shows three source PEs 201, one for each type of input stream. The other PEs 202 are analytic PEs, each one executing one type of algorithm, e.g., Load Star, Grub Join, to correlate the data and produce the expected output. One such example is the Micro Cluster PE 204. This PE analyzes the data of the application and assigns a claim suspicion level. This field is further analyzed and correlated with data coming from other PEs. Examples of output produced by DAC include an identification of the top fraudulent claims as well as claims that may be being treated unfairly.

The intrusion detection module is based on the BFPM (B-FSM based Pattern Matching) pattern-matching engine, described in [van Lunteren 2006]. BFPM builds upon the B-FSM, which is a programmable state-machine technology. The main characteristic of this engine is to have a deterministic processing rate, which is independent of number and size of the configured patterns. The patterns can be configured to match the rules of a network intrusion detection system (IDS). As an example, one pattern can be "block all packets with destination port 8080". Another feature of BFPM is to be dynamically reconfigurable. Patterns can be added and removed during runtime. Patterns can be specified with regular expressions and are compiled to a compact format. This results in an efficient use of the memory available on the FPGA. With current FPGA technology, BFPM can achieve processes rates up to 10 Gb/sec.

The rational behind the integration of DAC and BFPM is that the intrusion detection information can be used as another stream of data. The information about attempts of intrusion to the system can be used to influence the decision of which claims are suspicious.

Figure 3:
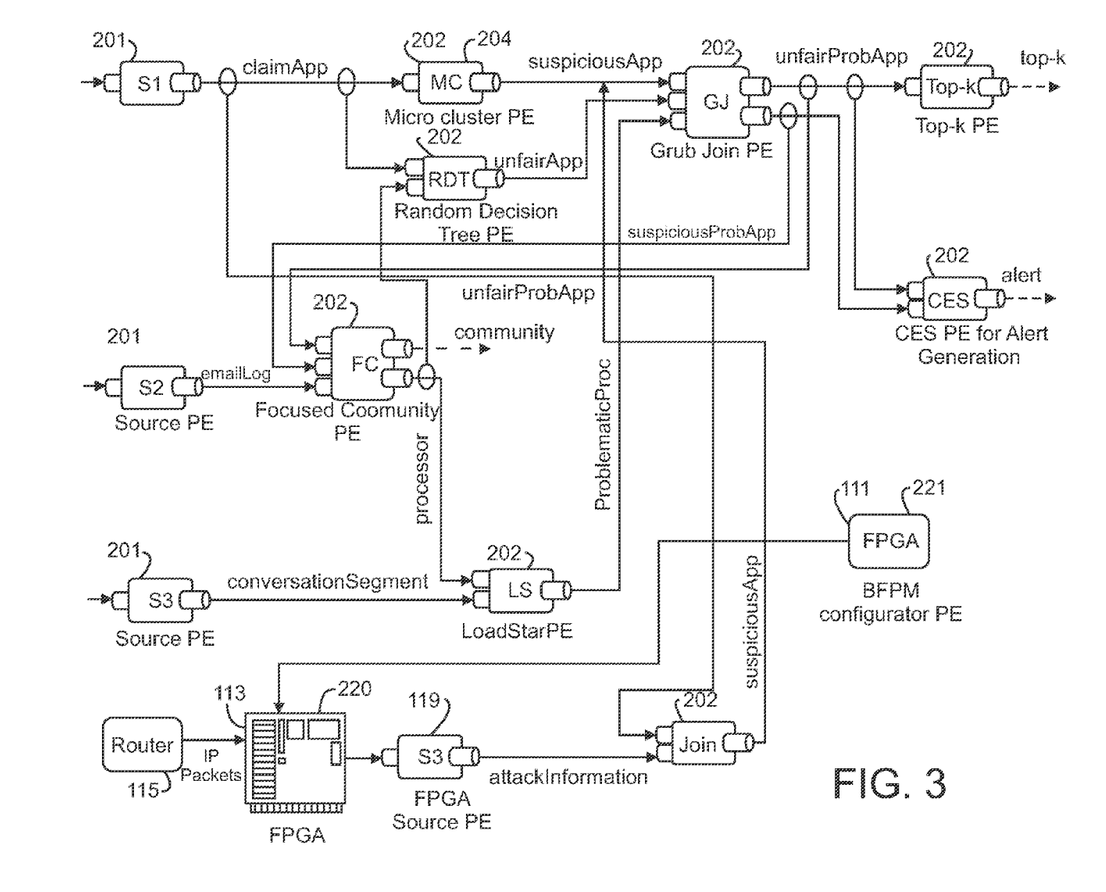
FIG. 3 is an embodiment of the Processing Element Flow graph from the Disaster Assistance Claim reference application augmented with the Processing Elements added to use the data generated by the FPGA card.

Referring to FIG. 3, an example of how the IDS data is integrated to the DAC application is illustrated. Integration of BFPM is though use of a stream accelerator 113 in the form of an FPGA 220 loaded with a compiled image and associated configuration data supplied by the configuration agent 111 in the form of a configurator PE 221.

For this application, the BFPM is loaded with standard rules of a Snort firewall (http://www.snort.org). These rules are compiled to the BFPM format. During the deployment of the DAC job, the Resource Manager 111 (FIG. 1) knows the location of the FPGA and how to access its manager, i.e., its config address:port. The Resource Manager sends a request to the manager requesting the load of the BFPM bit file (synthesized BFPM design) to the FPGA card. The bit file is the compiled program that is loaded into the accelerator device (FPGA). After the bit file is loaded, a BFPM configurator PE sends out the Snort rules to BFPM. The snort rules are the additional configuration data employed by the image loaded into the accelerator (FPGA). It is important to notice that this step is necessary only because the BFPM requires an additional configuration after the bit file is loaded, being an application specific solution. The workload starts producing IP packets, which simulate attacks to the system. The workload here serves the role of the real time data flow router. It produces packets at a very high rate, emulating the traffic of a real network. By using the FPGA, the rate needed to be handled by the FPGA Source PE is decreased, since BFPM eliminates all the unnecessary data at a very high processing rate. For every rule that matches a pattern, the BFPM sends data to a FPGA Source PE informing the attacking IP and which firewall rules it matched. The FPGA Source PE forwards this information to a new Join PE which tries to correlate the attacking IP to a source IP of a claim being processed. If there is a match, the suspicion for the given claim increases. The result of this new Join PE is consumed by the same Grub Join of the original DAC application.

Methods and systems in accordance with exemplary embodiments of the present invention can take the form of an entirely hardware embodiment, an entirely software embodiment or an embodiment containing both hardware and software elements. In a preferred embodiment, the invention is implemented in software, which includes but is not limited to firmware, resident software and microcode. In addition, exemplary methods and systems can take the form of a computer program product accessible from a computer-usable or computer-readable medium providing program code for use by or in connection with a computer, logical processing unit or any instruction execution system. For the purposes of this description, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Suitable data processing systems for storing and/or executing program code include, but are not limited to, at least one processor coupled directly or indirectly to memory elements through a system bus. The memory elements include local memory employed during actual execution of the program code, bulk storage, and cache memories, which provide temporary storage of at least some program code in order to reduce the number of times code must be retrieved from bulk storage during execution.

Input/output or I/O devices, including but not limited to keyboards, displays and pointing devices, can be coupled to the system either directly or through intervening I/O controllers. Exemplary embodiments of the methods and systems in accordance with the present invention also include network adapters coupled to the system to enable the data processing system to become coupled to other data processing systems or remote printers or storage devices through intervening private or public networks. Suitable currently available types of network adapters include, but are not limited to, modems, cable modems, DSL modems, Ethernet cards and combinations thereof.

In one embodiment, the present invention is directed to a machine-readable or computer-readable medium containing a machine-executable or computer-executable code that when read by a machine or computer causes the machine or computer to perform a method for managing distributed acceleration components in accordance with exemplary embodiments of the present invention and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages. The computer-executable code can be stored on any suitable storage medium or database, including databases disposed within, in communication with and accessible by computer networks utilized by systems in accordance with the present invention and can be executed on any suitable hardware platform as are known and available in the art including the control systems used to control the presentations of the present invention.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A distributed computing system comprising:
   a plurality of nodes;
   a plurality of acceleration devices configurable in a plurality of distinct functions and disposed on one or more of the plurality of nodes;
   a database comprising a plurality of virtual acceleration device definitions, each virtual acceleration device definition comprising attributes comprising an acceleration device function from the plurality of distinct functions and acceleration device hardware requirements and a compiled program and external configuration data that when loaded into an acceleration device having the hardware requirements configures that acceleration device to realize the acceleration device function;
   an application programming interface to receive an inquiry comprising an identification of computing system resources to be used in processing the inquiry;
   a resource requirements and preferences manager to identify at least one virtual acceleration device definition having a suitable acceleration device function and capable of configuring an acceleration device in accordance with the computing system resources identified in the inquiry; and
   a deployment agent to configure at least one of the plurality of identified acceleration devices having the acceleration device hardware requirements in accordance with each identified virtual acceleration device definition.

2. The distributed computing system of claim 1, further comprising:
   a plurality of discovery agents to detect the plurality of acceleration devices dynamically; and
   a dynamic router controller to route computing system stream data to and from each identified acceleration device dynamically.

3. The distributed computing system of claim 2, wherein the dynamic router controller configures the acceleration device to receive packets across a network originating from one or more nodes within the computing system and to produce packets across the network destined to one or more of the nodes.

4. The distributed computing system of claim 1, further comprising a system scheduler to schedule and to dispatch at least one inquiry process element to process the inquiry, each inquiry process element utilizing at least one of the acceleration devices.

5. The distributed computing system of claim 4, wherein the system scheduler is further configured to identify a program corresponding to the scheduled process element during runtime, and the deployment agent is further configured to load the identified program into the acceleration device coincidental with dispatching the corresponding process element.

6. The distributed computing system of claim 4, wherein the database further comprises at least one policy to govern the use of acceleration devices within the computing system and the system scheduler performs scheduling of process elements utilizing acceleration devices and configuring the acceleration devices in accordance with the at least one policy.

7. The distributed computing system of claim 4, wherein the system scheduler identifies a first set of process elements, dispatches the first set of process elements to nodes utilizing acceleration devices and identifies a second set of process elements separate from the first set, wherein the process elements in the second set are not dispatched to nodes due to a lack of available acceleration devices.

8. The distributed computing system of claim 7, wherein:
   the system scheduler identifies a revised first set of process elements comprises process elements utilizing one or more virtual acceleration device definitions that differ from the virtual acceleration device definitions utilized with the previous first set of process elements and identifies a revised second set of process elements; and
   the deployment agent reconfigures one or more acceleration devices in accordance with the different virtual acceleration device definitions associated with the revised first set of process elements.

9. The distributed computing system of claim 7, wherein the system scheduler utilizes administrator policy specifications and user rules to rank processing elements and places each process element that utilizes the acceleration devices into either the first set of process elements or the second set of process elements in accordance with the rank.

10. The distributed computing system of claim 1, wherein the acceleration devices comprise a field programmable gate array, an application specific integrated circuit, a complex programmable logic device or combinations thereof.

11. The distributed computing system of claim 1, wherein the identified computing system resources comprise data stream acceleration devices required to process the inquiry and preferred data stream acceleration devices to be used in processing the inquiry.

12. The distributed computing system of claim 1, wherein database comprises a persistent memory storage location.

* * * * *